United States Patent
Nam et al.

(10) Patent No.: US 9,265,123 B2
(45) Date of Patent: Feb. 16, 2016

(54) CONTROLLING BRIGHTNESS OF LAMP IN DISPLAY DEVICE

(75) Inventors: Kwang-woo Nam, Seoul (KR); Jun-Deok Choi, Seoul (KR); Min-ki Ahn, Seoul (KR)

(73) Assignee: ROHM CO., LTD. (JP)

( * ) Notice: Subject to any disclaimer, the term of this patent is extended or adjusted under 35 U.S.C. 154(b) by 1167 days.

(21) Appl. No.: 13/268,189

(22) Filed: Oct. 7, 2011

(65) Prior Publication Data

US 2013/0088156 A1   Apr. 11, 2013

(51) Int. Cl.
*H05B 37/02* (2006.01)
*G09G 3/36* (2006.01)
*G09G 3/34* (2006.01)

(52) U.S. Cl.
CPC .............. *H05B 37/02* (2013.01); *G09G 3/3426* (2013.01); *G09G 3/36* (2013.01); *H05B 37/0218* (2013.01); *G09G 2330/021* (2013.01); *G09G 2330/028* (2013.01); *G09G 2360/144* (2013.01); *Y02B 20/46* (2013.01)

(58) Field of Classification Search
CPC .... H05B 37/0218; H05B 37/02; H05B 41/36; G09G 3/36; Y02B 20/46; G02F 1/133
USPC ............... 315/158, 307, 308; 345/102
See application file for complete search history.

(56) References Cited

U.S. PATENT DOCUMENTS

| 5,760,760 A | * | 6/1998 | Helms | 345/102 |
| 7,755,595 B2 | * | 7/2010 | Ferguson | 345/102 |
| 2008/0062105 A1 | * | 3/2008 | Han et al. | 345/90 |

FOREIGN PATENT DOCUMENTS

| KR | 1020010091264 A | | 10/2001 |
| KR | 2006046977 A | * | 5/2006 |
| KR | 1020060046977 A | | 5/2006 |
| KR | 1020080000058 A | | 1/2008 |
| KR | 1020080024001 A | | 3/2008 |

OTHER PUBLICATIONS

KR Office Action from the Koren Patent Office for Korean Application 10-2009-0035386, Mailing Date: Aug. 23, 2014; with English translation.

* cited by examiner

*Primary Examiner* — Douglas W Owens
*Assistant Examiner* — Amy Yang
(74) *Attorney, Agent, or Firm* — Cantor Colburn LLP

(57) ABSTRACT

A display device includes a lamp unit, a dimming signal controller, and an inverter device. The dimming signal controller receives a lamp brightness signal and an external environment illumination signal, selects the lamp brightness signal or a signal based on the received external environment illumination signal, and outputs the selected signal as a dimming signal. The inverter device may operate to control brightness of the lamp unit based on the dimming signal.

9 Claims, 3 Drawing Sheets

CONTROLLING BRIGHTNESS OF LAMP IN DISPLAY DEVICE

TECHNICAL FIELD

The present disclosure relates to a method for controlling a light source brightness in a display device, and more particularly relates to a display device capable of controlling a light source brightness within a range in which the brightness can be visually recognizable by a human, in consideration of human's visual awareness variable according to an external illumination intensity, and a method for controlling the brightness thereof.

BACKGROUND

As information technology develops, display devices become more and more important as an information delivery medium. In the display device field, demand for a large screen, a reduction in weight, a reduction in thickness, high image quality, and the like are growing in line with such technology development, and in order to meet the requirements, a liquid crystal display (LCD), as a substitute for a conventional cathode-lay tube (CRT), has been widely used.

An LCD generally includes a substrate on which pixels are formed in a matrix, an opposite substrate, and a liquid crystal material having dielectric anisotropy interposed between the two substrates. The LCD is operated such that an electric field is applied between the two substrates and the strength of the applied electric field is adjusted to control the amount of light that transmits through the liquid crystal material to thus display a desired image. More specifically, when voltage is applied to the liquid crystal through pixel electrodes provided in each pixel of the LCD, the arrangement of liquid crystal are changed accordingly. As light passes through the liquid crystal of the changed state, the light is diffracted to obtain a desired image. Since an LCD is not a self-emissive display device, a lamp installed on a rear surface thereof operates as a light source.

An LCD is required to support a dimming function for controlling brightness of the lamp in order to obtain high image quality while reducing power consumption when displaying video images. A method for controlling brightness of the lamp includes an analog method for changing the strength of current flowing across the lamp and a PWM method for changing an on/off duty ratio for the current flowing across the lamp while uniformly maintaining the strength of the lamp current.

Meanwhile, photosensitivity and fatigue of human beings vary according to the intensity of the illumination of the environment. For example, in an environment in which the intensity of illumination is low, like at nighttime, the human eye is sensitive to even a small amount of light, compared with a brighter environment, making the human eyes feel easily tired. A maximum brightness level of a display device which can be recognized by the human eyes in a dark environment has a value lower than that in a bright environment. Therefore, in the environment in which an external intensity of illumination is low, although the brightness of the display device is increased up to the same level as that of the environment in which the external intensity of illumination is high, the human eyes cannot recognize the brightness of a certain level or higher. Nevertheless, an excessive increase in the brightness of the display device would simply cause unnecessary energy consumption.

Consequently, a display device capable of adjusting the brightness of a light source such that the brightness can be changed to have levels within an appropriate range recognizable by the human eye according to the intensity of illumination of the environment, and a method for controlling the brightness of the light source thereof are required.

SUMMARY

The present disclosure provides some embodiments of a display device capable of adjusting the brightness of a light source such that it can be changed to have levels within an appropriate range recognizable by human eyes according to the intensity of illumination of the environment, and a method for controlling the brightness of the light source thereof.

According to one embodiment of the present disclosure, a display device includes a lamp unit, a dimming signal controller, and an inverter device. The dimming signal controller may receive a lamp brightness signal and an external environment illumination signal, select the lamp brightness signal or a predetermined signal based on the received external environment illumination signal, and output the selected signal as a dimming signal. The inverter device may operate to control the brightness of the lamp unit based on the dimming signal.

DETAILED DESCRIPTION

Hereinafter, embodiments of the present disclosure will be described in detail with reference to the accompanying drawings. In the following description, if a detailed explanation for well-known functions or constitutions is considered to unnecessarily divert from the gist of the present disclosure, such explanation will be omitted. Further, it should be noted that the content described below is merely an embodiment of the present disclosure and the present disclosure is not limited thereto.

Figure 1:
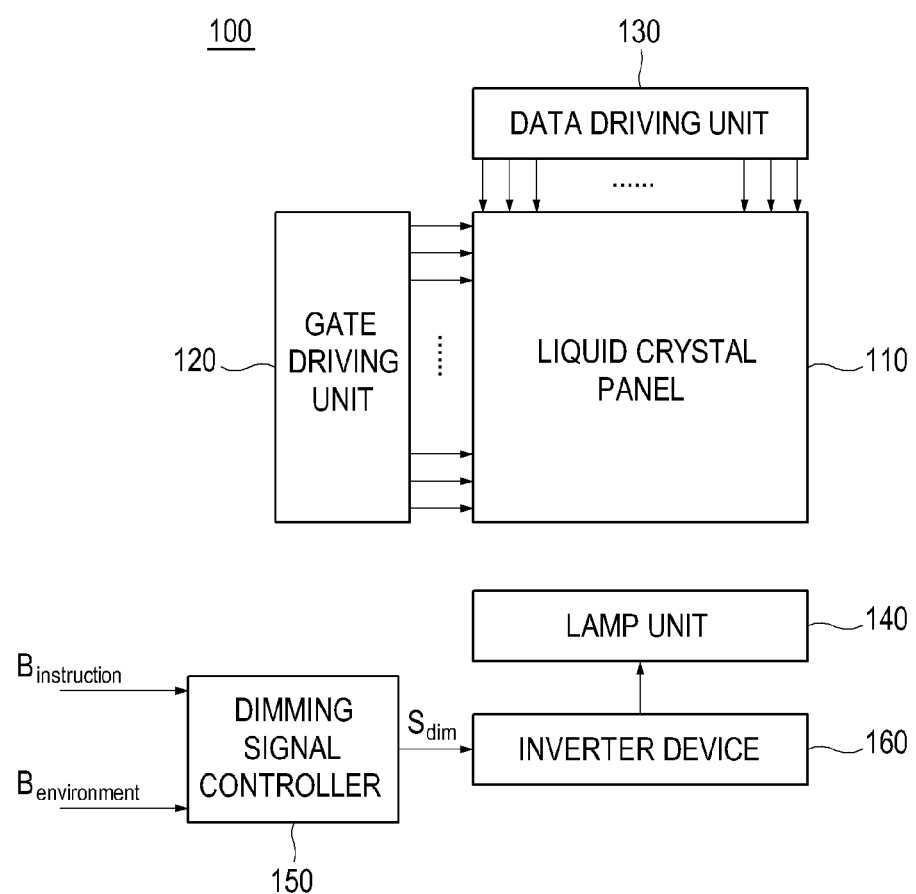
FIG. 1 is a schematic view showing a configuration of a liquid crystal display (LCD).

FIG. 1 is a view schematically showing the configuration of a liquid crystal display (LCD) 100. As illustrated, the LCD 100 includes a liquid crystal panel 110, a gate driving unit 120, a data driving unit 130, a lamp unit 140, a dimming signal controller 150, and an inverter device 160.

The liquid crystal panel 110 includes a pixel substrate having pixel patterns disposed in a matrix form. A plurality of gate lines and a plurality of data lines crossing the gate lines are formed on the pixel substrate and respective pixels are formed at the crossings of the gate lines and the data lines. Each pixel includes a thin film transistor (TFT) whose gate electrode and source electrode are connected to one gate line and one data line, respectively. A pixel electrode of the pixel is connected to a drain electrode of the TFT. When an electrical signal is applied to the gate electrode of the TFT through the gate line and an electrical signal is applied to the source electrode of the TFT through the data line, the TFT is turned on in response to the inputs of the electrical signals to output electrical signals for displaying an image to the drain electrode and the pixel electrode connected thereto.

The gate driving unit 120 is a circuit for sequentially applying a gate voltage to each of the plurality of gate lines located on the liquid crystal panel 110 to allow the gate lines to be sequentially selected. The gate driving unit 120 sequentially scans each gate line in one horizontal scan period based on a horizontal synchronization signal. Namely, the gate driving unit 120 applies a gate ON voltage to one gate line selected from the plurality of gate lines and simultaneously applies a gate OFF voltage to the remaining gate lines during the one horizontal scan period. This scanning process is sequentially performed on the entire gate lines. When a voltage is applied to the gate line, TFTs of the pixels connected to the corresponding gate line are turned on.

The data driving unit 130 is a circuit for applying a data voltage for displaying an image to each of the plurality of data lines located on the liquid crystal panel 110. The data driving unit 130 sequentially latches image data to generate scan line image data. Then, the data driving unit 130 generates a gray voltage signal for the scan line image data and applies the gray voltage signal to the data lines on the liquid crystal panel 110 in one horizontal scan period. The gray voltage signal supplied to the data lines from the data driving unit 130 is also applied to source electrodes of the TFTs of the pixels that are in a turned-on state after receiving the gate voltage from the gate driving unit 120. Thus, the gray voltage signal is applied to the pixel electrodes such that a certain image display operation is carried out. In this manner, the data driving unit 130 applies the gray voltage signal for the data lines for each horizontal scan period, and repeats this operation during one frame period based on one vertical synchronization signal.

The lamp unit 140 may be located below the pixel substrate of the liquid crystal panel 110 to operate as a light source of the LCD 100. The lamp unit 140 may be one of various types of lamps such as a cold cathode fluorescent lamp (CCFL), an external electrode fluorescent lamp (EEFL), a light emitting diode (LED), a flat fluorescent lamp (FFL), or the like. The lamp unit 140 includes a plurality of lamps, and may be divided into a plurality of groups respectively including one or more lamps.

The dimming signal controller 150 may receive a lamp brightness signal $B_{instruction}$ and an external environment illumination signal $B_{environment}$ input from the outside. Here, the lamp brightness signal $B_{instruction}$ is a signal designated and input by a user, which is a command signal instructing that the brightness of the lamp unit 140 of the liquid crystal panel 110 should have a certain level. The external environment illumination signal $B_{environment}$ is a signal indicating that intensity of illumination of an external environment is lower than a certain level. Although not illustrated in detail in FIG. 1, the external environment illumination signal $B_{environment}$ may be a signal generated by a separate illumination recognition sensor installed in the LCD 100. Alternatively, the external environment illumination signal $B_{environment}$ may be a signal generated when it is determined by a timer installed in the LCD 100 that a current time corresponds to a low illumination time (e.g., from 6:00 p.m. to 6:00 a.m.). Besides, a person skilled in the art may figure out various implementation examples for generating a signal indicating that the intensity of illumination of an external environment is lower than a certain level. The dimming signal controller 150 may generate a dimming command signal $S_{dim}$ appropriately controlled for the lamp unit 140 by using the received lamp brightness signal $B_{instruction}$ and the external environment illumination signal $B_{environment}$. A specific operation of the dimming signal controller 150 will be described below in more detail with reference to FIG. 2.

The inverter device 160 may receive the dimming command signal $S_{dim}$ generated by the dimming signal controller 150 and generate a lamp driving signal for the lamp unit 140 by using the dimming command signal $S_{dim}$. According to an embodiment of the present disclosure, the lamp driving signal generated by the inverter device 160 may be a brightness control signal based on a PWM scheme. Based on the PWM scheme, the lamp driving signal generated by the inverter device 160 can change an ON/OFF duty ratio of current flowing through each lamp while uniformly maintaining the strength of the current flowing through the lamp unit 140. Alternatively, the lamp driving signal generated by the inverter device 160 may be a brightness control signal based on an analog scheme. Based on the analog scheme, the lamp driving signal generated by the inverter device 160 can change the strength of current flowing through the lamp unit 140.

Figure 2:
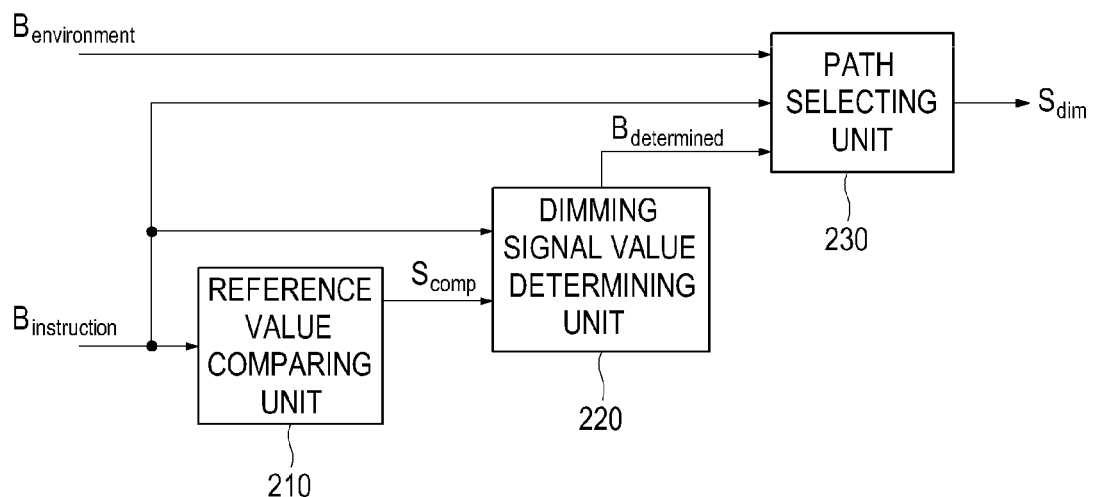
FIG. 2 is a detailed view showing the configuration of a dimming signal controller shown in FIG. 1.

FIG. 2 is a detailed view showing a configuration of the dimming signal controller 150 illustrated in FIG. 1. As shown in FIG. 2, the dimming signal controller 150 includes a reference value comparing unit 210, a dimming signal value determining unit 220, and a path selecting unit 230.

The reference value comparing unit 210 may receive a lamp brightness signal $B_{instruction}$ input and compare the received lamp brightness signal $B_{instruction}$ with a reference value signal $V_{ref}$. According to an embodiment of the present disclosure, the lamp brightness signal $B_{instruction}$ and the reference signal $V_{ref}$ may be certain predetermined voltage signals. According to an embodiment of the present disclosure, the reference value signal $V_{ref}$ may be a predetermined capacitor voltage signal. The reference value signal $V_{ref}$ may be a value determined to allow the lamp unit 140 of the LCD 100 to have a maximum brightness level when an external environment illumination is lower than a value, namely, a value determined in consideration of the recognition degree of human eyes depending on an external illumination. According to an embodiment, it should be appreciated that the reference value signal $V_{ref}$ may be changed. According to an embodiment of the present disclosure, when the reference value comparing unit 210 determines that the lamp brightness signal $B_{instruction}$ is greater than or equal to the reference value signal $V_{ref}$, it may provide an OFF level signal as a comparison result signal $S_{comp}$, and conversely, when the reference value comparing unit 210 determines that the lamp brightness signal $B_{instruction}$ is smaller than the reference value signal $V_{ref}$, it may provide an ON level signal as a comparison result signal $S_{comp}$.

The dimming signal value determining unit 220 may receive the lamp brightness signal $B_{instruction}$ input and the comparison result signal $S_{comp}$ of the reference value comparing unit 210, and may output a dimming signal value $B_{determined}$ determined based on the received lamp brightness signal $B_{instruction}$ and the comparison result signal $S_{comp}$. Specifically, the dimming signal value determining unit 220 may output, as the dimming signal value $B_{determined}$, the lamp brightness signal $B_{instruction}$ or a brightness signal based on the comparison result signal $S_{comp}$ received from the reference value comparing unit 210. According to an embodiment of the present disclosure, when the comparison result signal $S_{comp}$ received from the reference value comparing unit 210 has an ON level (namely, when the lamp brightness signal $B_{instruction}$ is smaller than the reference value signal $V_{ref}$), the dimming signal value determining unit 220 may output the lamp brightness signal $B_{instruction}$ as the dimming signal value $B_{determined}$ as it is. Conversely, when the comparison result signal received from the reference value comparing unit 210 has an OFF level (namely, when the lamp brightness signal $B_{instruction}$ is greater than or equal to the reference value signal $V_{ref}$), the dimming signal value determining unit 220 may output a brightness signal as the dimming signal value $B_{determined}$. Here, the brightness signal may be a value determined to allow the lamp unit 140 of the LCD 100 to have a maximum brightness level when an external environment illumination is lower than a value, namely, a value determined in consideration of the recognition degree of human eyes depending on external illumination. According to an embodiment of the present disclosure, the brightness signal may be the same value as the foregoing reference value signal $V_{ref}$.

The path selecting unit 230 may receive an external environment illumination signal $B_{environment}$ and a lamp brightness signal input. Also, the path selecting unit 230 may receive a dimming signal value $B_{determined}$ output from the dimming signal value determining unit 220. According to an embodiment of the present disclosure, the path selecting unit 230 may include a double-pole single-throw (DPST) switching element. When the external environment illumination signal $B_{environment}$ is an OFF level signal, the path selecting unit 230 may output the received lamp brightness signal $B_{instruction}$ as it is. Conversely, when the external environment illumination signal $B_{environment}$ is an ON level signal, the path selecting unit 230 may output the dimming signal value $B_{determined}$ signal received from the dimming value determining unit 220.

Figure 3:
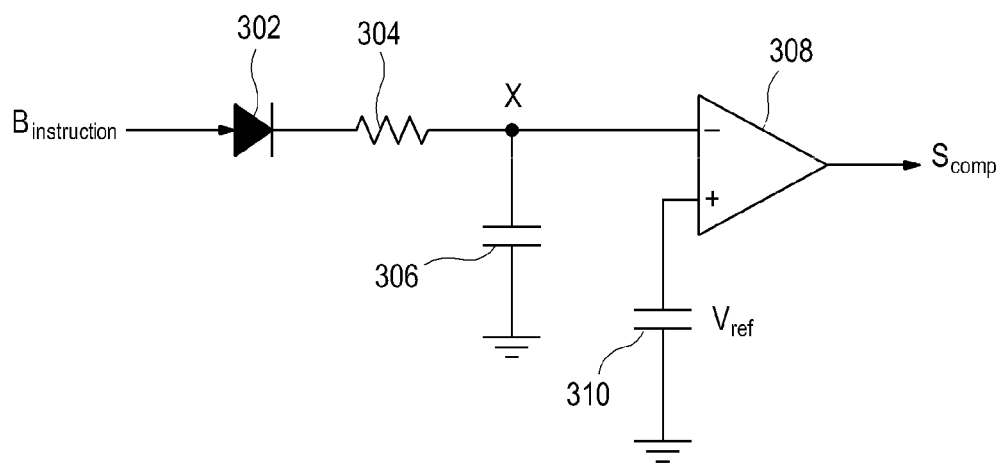
FIG. 3 is a detailed view showing the configuration of the reference value comparing unit shown in FIG. 2 according to an embodiment of the present disclosure.

FIG. 3 is a detailed view showing a configuration of the reference value comparing unit illustrated in FIG. 2 according to an embodiment of the present disclosure. A person skilled in the art will appreciate that the circuit illustrated in FIG. 3 is merely an embodiment for implementing the present disclosure and the present disclosure is not limited thereto. Also, a person skilled in the art can easily understand the operation of the illustrated circuit, so only the configuration of the circuit illustrated in FIG. 3 will be briefly described.

As illustrated, the reference value comparing unit 210 may include a diode 302. The diode 302 serves to prevent a reverse current in the reference value comparing unit 210, in which an anode of the diode 302 is connected to an input terminal of the reference value comparing unit 210. As described above, the lamp brightness signal $B_{instruction}$ may be input to the input terminal of the reference value comparing unit 210.

The reference value comparing unit 210 may further include a resistor 304 and a capacitor 306. As illustrated, one of both ends of the resistor 304 is connected to a cathode of the diode 302 and the other thereof is connected to one electrode of the capacitor 306. The opposite electrode of the capacitor 306 is connected to a ground. The lamp brightness signal $B_{instruction}$ input from the outside may be transferred to the resistor 304 through the diode 302, and then transferred to the capacitor 306. The resistor 304 and the capacitor 306 may operate as an RC integrator to allow the input lamp brightness signal $B_{instruction}$ to be transferred in a stable state to the next stage.

The reference value comparing unit 210 may further include a comparator 308 and a reference value capacitor 310. As illustrated, a contact point X between the resistor 304 and the capacitor 306 is connected to an inverting input terminal of the comparator 308. Thus, the lamp brightness signal $B_{instruction}$, which has passed through the resistor 304 and the capacitor 306, may be input to the inverting input terminal of the comparator 308. As illustrated, one electrode of the reference value capacitor 310 is connected to ground, and the opposite electrode is connected to a non-inverting input terminal of the comparator 308. The reference value capacitor 310 may supply the reference voltage value $V_{ref}$ to the comparator 308. As described above, the reference voltage value $V_{ref}$ is a value determined to allow the lamp unit 140 of the LCD 100 to have a maximum brightness level when an external environment illumination is lower than a predetermined value, namely, a value determined in consideration of the recognition degree of human eyes depending on an external illumination. According to an embodiment, it is to be appreciated that the reference voltage value $V_{ref}$ may be changed. The comparator 308 may compare the lamp brightness signal $B_{instruction}$ input via the inverting input terminal and the reference voltage value $V_{ref}$ input via the non-inverting input terminal. As a result of the comparison, when the comparator 308 determines that the lamp brightness signal $B_{instruction}$ is greater than or equal to the reference voltage value $V_{ref}$, the comparator 308 may output an OFF level signal as a comparison result signal $S_{comp}$, and conversely, when the comparator 308 determines that the lamp brightness signal $B_{instruction}$ is smaller than the reference voltage value $V_{ref}$, the comparator 308 may output an ON level signal as the comparison result signal $S_{comp}$.

Figure 4:
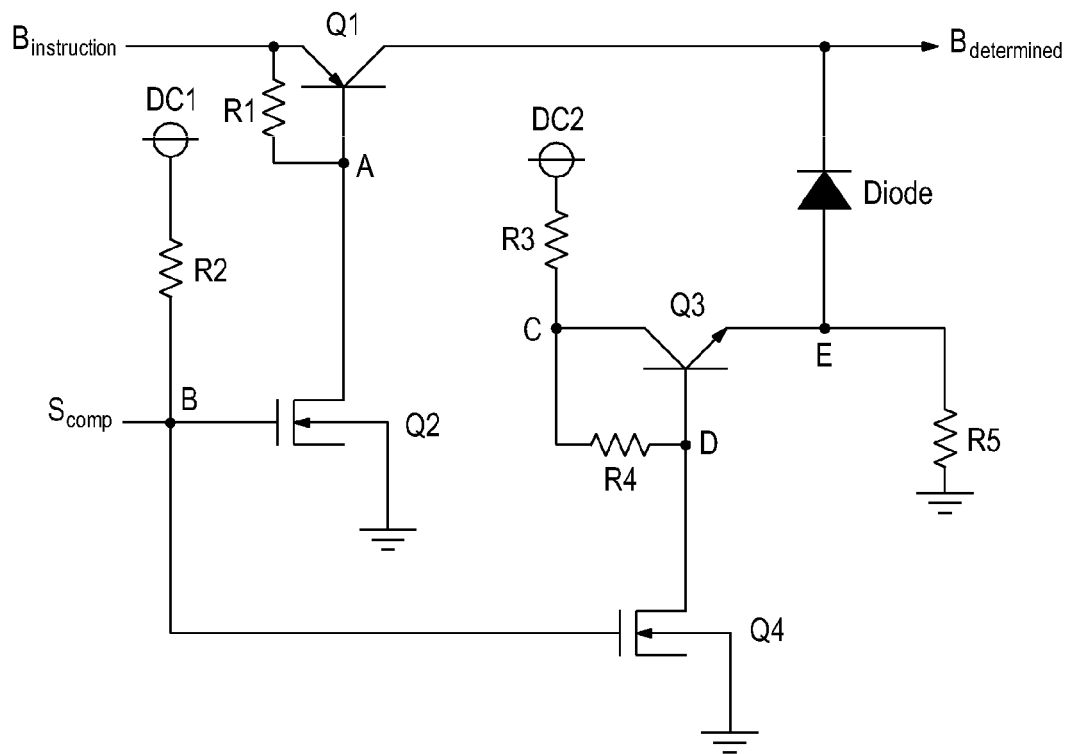
FIG. 4 is a detailed view showing the configuration of the dimming signal value determining unit shown in FIG. 2 according to an embodiment of the present disclosure.

FIG. 4 is a detailed view showing the configuration of the dimming signal value determining unit 220 shown in FIG. 2 according to an embodiment of the present disclosure. A person skilled in the art will appreciate that the circuit illustrated in FIG. 4 is merely an embodiment for implementing the present disclosure and the present disclosure is not limited thereto. Also, a person skilled in the art can easily understand the operation of the illustrated circuit, so only the configuration of the circuit illustrated in FIG. 4 will be briefly described.

As illustrated in FIG. 4, the dimming signal value determining unit 220 may receive the comparison result signal $S_{comp}$ output from the reference value comparing unit 210 and the lamp brightness signal $B_{instruction}$ input received from an outside source. As described above, when the lamp brightness signal $B_{instruction}$ is greater than or equal to the reference voltage value $V_{ref}$, the comparison result signal $S_{comp}$ output from the reference value comparing unit 210 may be an OFF level signal, and conversely, when the lamp brightness signal $B_{instruction}$ is smaller than the reference voltage value $V_{ref}$, comparison result signal $S_{comp}$ may be an ON level signal. Also, as illustrated in FIG. 4, the dimming signal value determining unit 220 includes two DC voltage supply sources DC1 and DC2, four switching elements Q1, Q2, Q3, and Q4, five resistors R1, R2, R3, R4, and R4, and one diode.

As illustrated, the lamp brightness signal $B_{instruction}$ may be input to one terminal of the switching element Q1. As illustrated, the lamp brightness signal $B_{instruction}$ may be also connected to an ON/OFF control terminal of the switching element Q1 through the resistor R1. Here, it is assumed that a contact point between the resistor R1 and the ON/OFF control terminal of the switching element Q1 is a contact point A. The other terminal of the switching element Q1 may be connected to an output terminal $B_{determined}$ of the dimming signal value determining unit 220. According to an embodiment of the present disclosure, the switching element Q1 may be a PNP type transistor, but the present disclosure is not limited thereto. When the switching element Q1 is a PNP type transistor, one terminal of the foregoing switching element Q1 may be an emitter, the other terminal may be a collector, and the ON/OFF control terminal may be a base.

The comparison result signal $S_{comp}$ input from the reference value comparing unit 210 may be connected with a voltage signal from a DC voltage supply source DC1 at a contact point B. The resistor R2 for preventing an overvoltage may be located between the DC voltage supply source DC1 and the contact point B. The contact point B may be connected to the ON/OFF control terminal of the switching element Q2. Also, the contact point A between the resistor R1 and the ON/OFF control terminal of the switching element Q1 may be connected to one terminal of the switching element Q2. The other element of the switching element Q2 may be connected to ground. According to an embodiment of the present disclosure, the switching element Q2 may be a field effect transistor, but the present disclosure is not limited thereto. When the switching element Q2 is a field effect transistor, one terminal of the foregoing switching element Q2 may be a drain, the other terminal may be a source, and an ON/OFF control terminal may be a gate. When the comparison result signal $S_{comp}$ from the reference value comparing unit 210 has an ON level, the switching element Q1 and the switching element Q2 may be turned on. Conversely, when the comparison result signal $S_{comp}$ from the reference value comparing unit 210 has an OFF level, the switching element Q1 and the switching element Q2 may be turned off.

Also, as illustrated, the voltage signal from the DC voltage supply source DC2 may be connected to one terminal of the switching element Q3 through the resistor R3 for preventing an overvoltage. Namely, as illustrated, one terminal of the resistor R3 is connected to the DC voltage supply source DC2 and the other terminal is connected to one terminal of the switching element Q3. A contact point C between the resistor R3 and the switching element Q3 may be connected to an ON/OFF control terminal of the switching element Q3 through the resistor R4. The other remaining terminal of the switching element Q3 may be connected to an anode of the diode. According to an embodiment of the present disclosure, the switching element Q3 may be a NPN type transistor, but the present disclosure is not limited thereto. When the switching element Q3 is an NPN type transistor, one terminal of the foregoing switching element Q3 may be a collector, the other terminal thereof may be an emitter, and an ON/OFF control terminal may be a base.

Also, as illustrated in FIG. 4, an ON/OFF control terminal of the switching element Q4 is connected to the contact point B. A contact point D between the resistor R4 and the ON/OFF control terminal of the switching element Q3 may be connected to one of both terminals of the switching element Q4. The other remaining terminal of the switching element Q4 may be connected to ground. According to an embodiment of the present disclosure, the switching element Q4 may be a field effect transistor, but the present disclosure is not limited thereto. When the switching element Q4 is a field effect transistor, one terminal of the foregoing switching element Q4 may be a drain, the other terminal may be a source, and an ON/OFF control terminal may be a gate.

A contact point E between the other terminal of the switching element Q3 and the anode of the diode may be connected to one terminal of the resistor R5. The other terminal of the resistor R5 may be connected to ground. The cathode of the diode may be connected to the output terminal $B_{determined}$ of the dimming signal value determining unit 220. When the comparison result signal $S_{comp}$ from the reference value comparing unit 210 has an ON level, the switching element Q4 may be turned on and the switching element Q3 may be turned off. Conversely, when the comparison result signal $S_{comp}$ from the reference value comparing unit 210 has an OFF level, the switching element Q4 may be turned off and the switching element Q3 may be turned on.

According to an embodiment of the present disclosure, when the comparison result signal $S_{comp}$ from the reference value comparing unit 210 has an ON level, the switching element Q1, the switching element Q2, and the switching element Q4 are turned on, whereas the switching element Q3 is turned off. Accordingly, the lamp brightness signal $B_{instruction}$ is transferred to the output terminal $B_{determined}$ of the dimming signal value determining unit 220. Conversely, when the comparison result signal $S_{comp}$ from the reference value comparing unit 210 has an OFF level, the switching element Q1, the switching element Q2, and the switching element Q4 are turned off, whereas the switching element Q3 is turned on. Accordingly, the voltage from the DC voltage supply source DC2 is transferred to the output terminal $B_{determined}$ of the dimming signal value determining unit 220 through a voltage distribution of the resistors R3 and R5. The values of the resistors R3 and R5 may be determined according to the maximum brightness level of the lamp unit 140 of the LCD 100 when an external environment illumination is lower than a predetermined value, namely, may be determined in consideration of the recognition degree of human eyes depending on an external illumination.

In the present disclosure, the LCD has been largely described, but it should be appreciated that the present disclosure is not limited thereto. It should also be noted that the present disclosure can be applicable to various electronic display devices, such as an electrochemical display (ECD), an electrophoretic image display (EPID), a twisting ball display (TBD), a suspended particle display (SPD), or the like, which includes a light source and can control the brightness of the light source.

According to embodiments of the present disclosure, since the brightness of a light source of the display device is adjusted such that it can be changed to have levels within an appropriate range recognizable by human eyes depending on the intensity of illumination of an external environment, the brightness of the light source is prevented from being necessarily increased up to a level of a range unrecognizable by human eyes in a dark environment, and thus, the occurrence of an unnecessary waste of energy can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
   a lamp unit;
   a dimming signal controller that receives a lamp brightness signal and an external environment illumination signal, selects the lamp brightness signal or a signal based on the received external environment illumination signal, and outputs the selected signal as a dimming signal; and
   an inverter device operating to control brightness of the lamp unit based on the dimming signal,
   wherein the dimming signal controller comprises:
   a reference value comparing unit that compares the lamp brightness signal and a reference value;
   a dimming signal value determining unit that outputs either the lamp brightness signal or the signal based on comparison by the reference value comparing unit; and
   a path selecting unit that selects one of the lamp brightness signal and the signal based on the external environment illumination signal, wherein the reference value comparing unit comprises:
an input terminal that receives the lamp brightness signal;
a diode, wherein an anode of the diode is connected to the input terminal;
an RC integrator connected to a cathode of the diode;
a reference value capacitor that stores the reference value; and
a comparator that compares a signal received from the RC integrator and a signal received from the reference value capacitor,
wherein the comparator outputs a comparison result signal, and wherein when the signal received from the RC integrator is greater than or equal to the signal received from the reference value capacitor, the comparison result signal is an OFF level and when the signal received from the RC integrator is smaller than the signal received from the reference value capacitor, the comparison result signal is an ON level.

2. The display device of claim 1, wherein the external environment illumination signal is a signal indicating whether an intensity of illumination of an external environment is less than a certain level.

3. The display device of claim 2, further comprising an illumination recognition sensor,
wherein the illumination recognition sensor generates the external environment illumination signal based on determining whether the intensity of illumination of the external environment is less than the certain level.

4. The display device of claim 2, further comprising a timer,
wherein the timer generates the external environment illumination signal depending on whether or not a current time is within a time range.

5. The display device of claim 1, wherein the dimming signal value determining unit includes a first switch, a second switch, a third switch, and a fourth switch,
wherein when the comparison result signal is the ON level, the first switch, the second switch, and the third switch are turned on and the fourth switch is turned off, and when the comparison result signal is the OFF level, the first switch, the second switch, and the third switch are turned off and the fourth switch is turned on, and
wherein when the first switch is turned on, the dimming signal value determining unit outputs the lamp brightness signal, and when the fourth switch is turned on, the dimming signal value determining unit outputs the signal.

6. The display device of claim 1, wherein the path selecting unit includes a double-pole single-throw (DPST) switching element.

7. The display device of claim 1, wherein the display device is a liquid crystal display (LCD).

8. A method for controlling brightness of a lamp in a display device, the method comprising:
receiving a lamp brightness signal and an external environment illumination signal;
outputting the lamp brightness signal as a dimming signal if the external environment illumination signal indicates that illumination of external environment is greater than or equal to a predetermined level;
if the external environment illumination signal indicates that the illumination of the external environment is less than the predetermined level,
outputting the lamp brightness signal as the dimming signal when the lamp brightness signal is less than a predetermined reference value; and
outputting a predetermined brightness signal as the dimming signal when the lamp brightness signal is greater than or equal to a predetermined reference value; and
controlling lamp brightness of the display device by using the dimming signal.

9. A display device, comprising:
a lamp unit;
a dimming signal controller that receives a lamp brightness signal, which is input by a user, and an external environment illumination signal to output a dimming signal for controlling the lamp unit; and
an inverter device that receives the lamp brightness signal from the dimming signal controller as the dimming signal if the external environment illumination signal indicates that illumination of external environment is greater than or equal to a predetermined level; if the external environment illumination signal indicates that the illumination of the external environment is less than the predetermined level, receives the lamp brightness signal from the dimming signal controller as the dimming signal when the lamp brightness signal is less than a predetermined reference value, and receives a predetermined brightness signal from the dimming signal controller as the dimming signal when the lamp brightness signal is greater than or equal to a predetermined reference value; and operates to control brightness of the lamp unit based on the dimming signal.

* * * * *